United States Patent
Boelling et al.

(10) Patent No.: US 8,057,311 B2
(45) Date of Patent: Nov. 15, 2011

(54) SLIDING BLOCK FOR A TORSIONAL VIBRATION DAMPER, SEPARATOR SHEET COMPRISING A SLIDING BLOCK, TORSIONAL VIBRATION DAMPER COMPRISING A SLIDING BLOCK AND METHOD FOR PRODUCING A SLIDING BLOCK

(75) Inventors: Jochen Boelling, Baden-Baden (DE); Christian Bernhard Halm, Walldorf (DE); Till Martin Lutz Ebner, Seeheim-Jugenheim (DE); Volker Heinz, Roemerberg (DE)

(73) Assignee: BorgWarner Inc., Auburn Hills, MI (US)

( * ) Notice: Subject to any disclaimer, the term of this patent is extended or adjusted under 35 U.S.C. 154(b) by 285 days.

(21) Appl. No.: 12/517,657

(22) PCT Filed: Nov. 22, 2007

(86) PCT No.: PCT/EP2007/010113
§ 371 (c)(1),
(2), (4) Date: Jun. 4, 2009

(87) PCT Pub. No.: WO2008/071300
PCT Pub. Date: Jun. 19, 2008

(65) Prior Publication Data
US 2010/0056283 A1    Mar. 4, 2010

(30) Foreign Application Priority Data
Dec. 14, 2006   (DE) .......................... 10 2006 058 954

(51) Int. Cl.
*F16F 15/123* (2006.01)
(52) U.S. Cl. .................................... 464/68.92

(58) Field of Classification Search .............. 464/64.1, 464/67.1, 68.1, 68.8, 68.9, 68.92; 267/170, 267/220, 221; 264/279; 192/205; 29/DIG. 5
See application file for complete search history.

(56) References Cited

U.S. PATENT DOCUMENTS

| | | | | |
|---|---|---|---|---|
| 2,794,756 | A * | 6/1957 | Leverenz | 264/279 |
| 3,991,146 | A * | 11/1976 | Barrie | 264/279 |
| 4,347,717 | A | 9/1982 | Lamarche | 464/64 |
| 5,218,884 | A * | 6/1993 | Rohrle | 464/68.92 |
| 5,307,710 | A * | 5/1994 | Feldhaus et al. | 464/68.92 |
| 5,377,560 | A * | 1/1995 | Schierling et al. | 464/68.92 |
| 5,551,928 | A * | 9/1996 | Sudau | 464/68.1 |

(Continued)

FOREIGN PATENT DOCUMENTS

DE         102 09 838 A1      9/2002

(Continued)

*Primary Examiner* — Gregory Binda
*Assistant Examiner* — Josh Skroupa
(74) *Attorney, Agent, or Firm* — Bliss McGlynn, P.C.

(57) ABSTRACT

A torsional vibration damper includes at least one spring element and a sliding block. The sliding block includes a first surface section that operatively faces an adjacent spring element, is harder than another surface section of the sliding block, has first and/or second supporting surfaces for radial support of the spring element, and has first and/or second supporting surfaces for axial support of the spring element. A second surface section has a sliding surface for sliding support of the sliding block, and a basic body includes plastic. The first and/or second surface section(s) is/are formed by at least one first insert that is harder than the plastic. The first surface section is formed by at least two elongate second inserts that are spaced apart from one another and projected and on which the spring element can be supported in a centering manner in a radial direction.

25 Claims, 5 Drawing Sheets

U.S. PATENT DOCUMENTS

| | | | | |
|---|---|---|---|---|
| 5,562,542 A | * | 10/1996 | Rohrle | 464/68.92 |
| 6,962,533 B2 | * | 11/2005 | Zottmann et al. | 464/68.92 |
| 2002/0128074 A1 | * | 9/2002 | Jackel et al. | 464/68.92 |
| 2002/0147051 A1 | * | 10/2002 | Jackel et al. | 464/68.92 |
| 2004/0200313 A1 | * | 10/2004 | Kroll et al. | |
| 2005/0026704 A1 | * | 2/2005 | Kroll et al. | |

FOREIGN PATENT DOCUMENTS

| | | | |
|---|---|---|---|
| EP | 529669 B1 | * | 3/1993 |
| EP | 0 994 272 B1 | | 4/2000 |
| EP | 1584838 A1 | * | 10/2005 |
| FR | 2 652 399 | | 3/1991 |

* cited by examiner

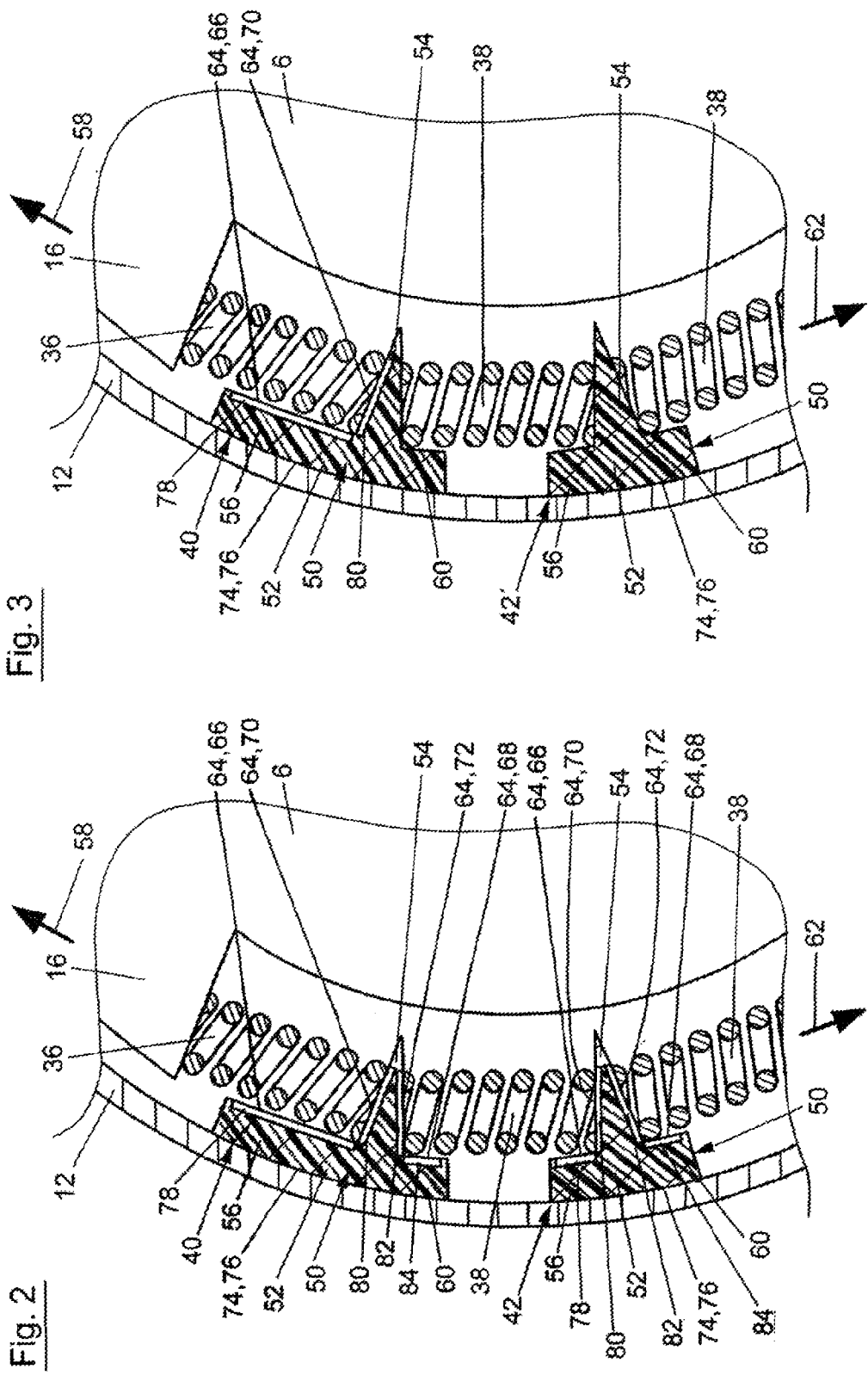

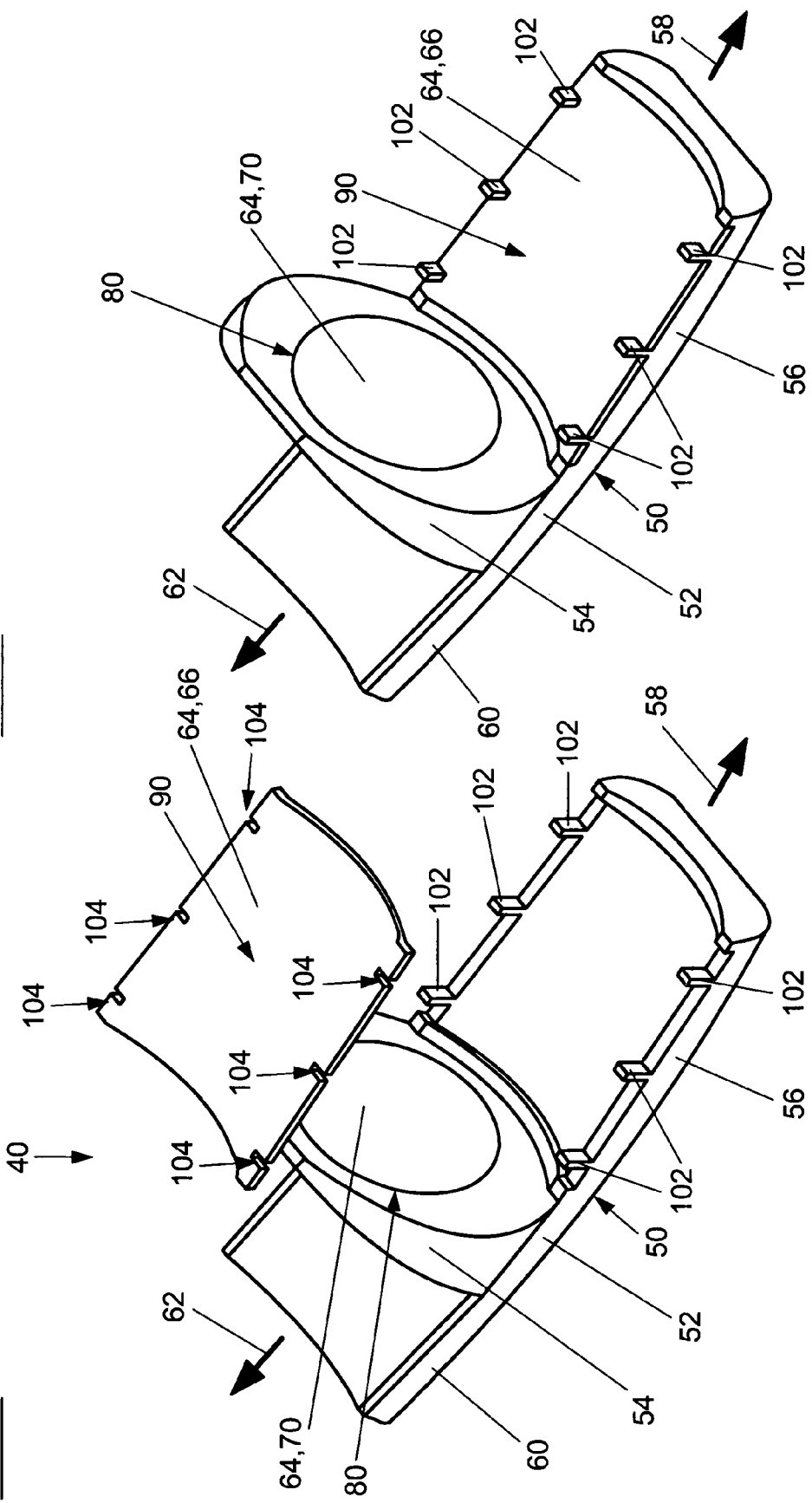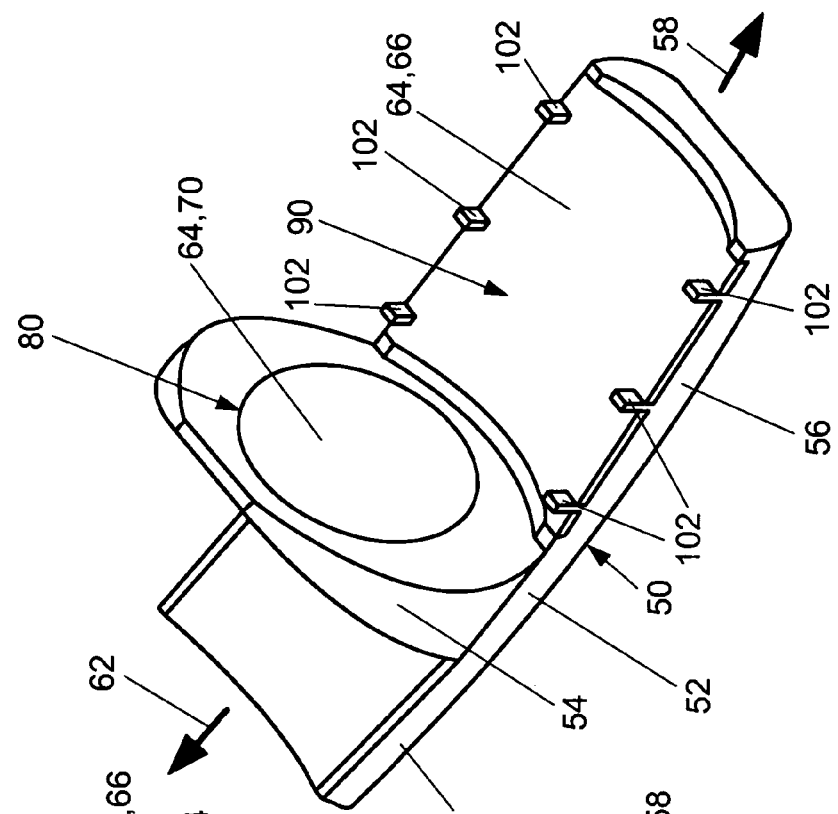

SLIDING BLOCK FOR A TORSIONAL VIBRATION DAMPER, SEPARATOR SHEET COMPRISING A SLIDING BLOCK, TORSIONAL VIBRATION DAMPER COMPRISING A SLIDING BLOCK AND METHOD FOR PRODUCING A SLIDING BLOCK

CROSS-REFERENCE TO RELATED APPLICATION

This application claims benefit of PCT Patent Application PCT/EP2007/010113 entitled "SLIDING BLOCK FOR A TORSIONAL VIBRATION DAMPER, SEPARATOR SHEET COMPRISING A SLIDING BLOCK, TORSIONAL VIBRATION DAMPER COMPRISING A SLIDING BLOCK AND METHOD FOR PRODUCING SLIDING BLOCK" and filed on Nov. 22, 2007.

BACKGROUND OF THE INVENTION

1. Field of the Invention

The present invention relates to a sliding block for a torsional vibration damper, with a first surface section which, in the installation state, faces an adjacent spring element. The present invention relates, furthermore, to a separator sheet comprising such a sliding block, to a torsional vibration damper comprising such a sliding block or separator sheet and to a method for producing such a sliding block.

2. Description of the Related Art

A multiplicity of torsional vibration dampers or rotary vibration dampers in various fields of use are known from the prior art. The known torsional vibration dampers are used, in particular, in motor vehicle construction for the elastic coupling of the internal combustion engine and drive train. This is to prevent torsional vibrations from being transferred from the internal combustion engine to the drive train or the transmission. Such a transfer occurs particularly in internal combustion engines having comparatively few cylinders and with low rotational speeds. With effective damping of such vibrations, the internal combustion engine can be operated at lower rotational speeds, thus generally resulting in a reduced fuel consumption.

Thus, EP 1584838 A1 describes a torsional vibration damper with a drive-side primary element and an output-side secondary element, the primary element being coupled spring-elastically to the secondary element via a spring device, so that these elements can be rotated with respect to one another about a neutral position. The primary and secondary elements comprise in each case dogs which are adjacent to the spring device and which are designated below as a primary or a secondary dog. A torque prevailing at the primary element on the drive side can therefore be transferred by means of the primary dog first to the spring device and from the spring device to the secondary element via the secondary dog.

The spring device of the known torsional vibration damper consists of a plurality of spring elements arranged one behind the other in the circumferential direction of the torsional vibration damper, the spring elements being helical springs. Between the spring elements, what are known as sliding blocks are arranged, on which the successive spring elements are supported and which connect the spring elements to one another. The sliding blocks are provided, on their side facing radially away from the axis of rotation of the torsional vibration damper, with a sliding surface which senates for supporting the spring device with respect to a wall of the torsional vibration damper.

Since such friction between the sliding block and the wall causes increased wear on the sliding block, while the abrasion which occurs leads to a contamination of the lubricant, such as, for example oil, within the torsional vibration damper, EP 1584838 A1 proposes, furthermore, to at least partially use what are known as separator sheets. These separator sheets are designed as ring elements and sliding blocks fastened to them, the sliding blocks, in turn, being arranged between the spring elements. Since the sliding blocks are arranged on the ring element in such a way that the centrifugal forces occurring during the operation of the torsional vibration damper and acting on the sliding blocks are in sum compensated completely or partially, the term "separating element" is also used instead of the designation of sliding block.

Another solution for improving the slideability of the sliding block and for reducing the abrasion on the sliding surface of the sliding block is known from EP 0529669 A1. The two-mass flywheel disclosed in this document comprises two flywheels which are rotatable in relation to one another and are coupled rotationally elastically to one another by means of a rotary vibration damper device, the rotary vibration damper device comprising one of the spring devices described in the introduction, which is composed essentially of spring elements and sliding blocks. The sliding blocks of the known spring device may consist, for example, of metal and be hardened in the region of the sliding surface pointing radially outward. Moreover, in a further embodiment, a sliding block consisting of plastic is proposed, the sliding surface of which is coated with a slide-friendly coat or contains an admixture of slide-friendly material, in particular Teflon.

The above-described prior art led to a reduction in the wear on the sliding block of the known spring devices. The wear on the sliding blocks is nevertheless still too high, and, in particular, this may lead to a contamination of the lubricant within the torsional vibration damper.

An object of the present invention, therefore, is to provide a sliding block for a torsional vibration damper, which sliding block is particularly wear-resistant and generates only insignificant abrasion during operation. The object on which the present invention is based is, furthermore, to specify a separator sheet comprising such an advantageous sliding block. Moreover, the object on which the invention is based is to provide a torsional vibration damper, of which the abrasion-induced contamination during operation is particularly low. A further object on which the invention is based is to specify a method for producing such an advantageous sliding block.

SUMMARY OF THE INVENTION

The present invention overcomes the disadvantages in the related art in a torsional vibration damper that employs a sliding block of the present invention. The torsional vibration damper includes at least one spring element, and the sliding block has a first surface section that operatively faces an adjacent spring, element and is harder than another surface section of the sliding block. The torsional-vibration damper employs a separator sheet of the present invention that includes the sliding block, and a method of the present invention produces the sliding block.

More specifically, the first surface section may be, for example, a coherent or multipart section of the surface. In the region of the first surface section, the sliding block may, for example, consist of a harder material or be coated with such.

The sliding block according to the invention has the essential advantage that the wear on the sliding block in the region which faces the spring element is lower due to the harder first surface section. Thus, during operation, the spring element can be contiguous to the first surface section and be moved along the latter, without high abrasion being generated.

In a preferred embodiment of the sliding block according to the invention, the first surface section has a supporting surface for the radial Support of the spring element. Thus, the spring element is supported in the radial direction with respect to its longitudinal axis on the supporting surface for radial support. In this case, the spring element may be supported on the supporting surface both permanently and only at specific rotational speeds. The latter is the case, for example, when, on account of the high rotational speed and the centrifugal force generated thereby, the spring element bends radially outward and only as a result of this comes to bear against the supporting surface. The harder supporting surface, in turn, prevents pronounced wear on the sliding block and reduces the abrasion.

In a further preferred embodiment of the sliding block according to the invention, the first surface section has a supporting surface for the axial support of the spring element. Thus, the spring element is supported in the axial direction with respect to its longitudinal axis oil the supporting surface for axial support. The forces acting on the sliding block in the axial direction can thereby also be suitably supported by the supporting surface for axial support, in order to prevent wear and abrasion on the sliding block.

According to a further preferred embodiment of the sliding block according to the invention, the sliding block has a second surface section which has a sliding surface for the sliding support of the sliding block. In the installation state of the sliding block, this sliding surface may, for example, point radially outward and be supported on a peripheral wall of the torsional vibration damper.

In a further preferred embodiment of the sliding block according to the invention, the second surface section is designed to be harder than another surface section of the sliding block. Since the second surface section, just like the first surface section, comes into frictional contact with another component of the torsional vibration damper, wear and abrasion can be prevented particularly reliably by means of this configuration.

In a particularly preferred embodiment of the sliding block according to the invention, the first surface section is designed to be harder than the second surface section. Since the spring elements, which are mostly designed as helical springs, are more likely because of their shape to be supported at a plurality of smaller locations oil the first surface section, while the sliding surface of the second surface section may bear over a larger area against another component of the torsional vibration damper, the second surface section does not have to be designed to be as hard as the first surface section in order to prevent wear. The outlay in terms of the production of such an embodiment of the sliding block is therefore reduced.

In an advantageous embodiment of the sliding block according to the invention, the sliding block has a basic body which consists of a basic material.

In a further advantageous embodiment of the sliding block according to the invention, the basic material of the basic body is plastic, preferably fiber-reinforced plastic. By plastic being used, the mass of the revolving sliding block can be kept low, while a high strength of the basic body is ensured, particularly as a result of the fiber reinforcement.

In a particularly advantageous embodiment of the sliding block according to the invention, the first and/or the second surface section are/is formed by at least one insert which is designed to be harder than the basic material. Thus, the insert may be formed, for example, by a metal part which is arranged oil the basic body consisting of plastic.

In a further particularly advantageous embodiment of the sliding block according to the invention, the insert is connected positively to the basic body. In contrast to a materially integral connection which is achieved, for example, with the aid of an adhesive, the production of a sliding block in which the insert is connected positively to the basic body is simpler. Furthermore, a better hold of the insert oil the basic body, even in the event of pronounced temperature variations, is ensured during the operation of the torsional vibration damper.

So that the sliding block can be produced particularly simply and to ensure a reliable hold of the insert oil the basic body, in a further preferred embodiment of the sliding block according to the invention the insert is cast into the basic material or is riveted together with the basic body. Thus, for example, the lateral margins of the insert may be surrounded by the basic material, whereas the middle part of the insert forms the first surface section pointing outward. Both the insert cast into of the basic material and the insert riveted together with the basic body are fastened particularly reliably to the basic body, and the sliding block can be manufactured particularly simply.

In a further particularly preferred embodiment of the sliding block according to the invention, the rivet bodies for riveting the insert are formed in one piece with the basic body. As a result of this, the sliding block can be manufactured particularly simply, especially since the rivet bodies could be manufactured, at least in a crude form, together with the basic body from the same basic material. This also avoids the need for the method step of fastening a separate rivet body to the basic body, and the basic body and rivet body are held together firmly.

In a further advantageous embodiment of the sliding block according to the invention, the first surface section is formed by at least two elongate inserts which are spaced apart from one another and project, and on which a spring element can be supported in a centering manner in the radial direction. Thus, the spring element supported radially outward is centered automatically and reliably in a predetermined position as a result of the special design of the two inserts.

In a further advantageous embodiment of the sliding block according to the invention, the insert is of plate-like design. A plate-like insert makes it possible to provide a large-area first surface section, without a multiplicity of small inserts having to be used in production, with the result that production is simplified.

In a particularly preferred embodiment of the sliding block according to the invention, the plate-like insert is curved in a way ensuring a large-area radial support of a spring element. Thus, the insert may be curved in such a way that the first surface section at least partially surrounds the spring element with a close fit, thereby ensuring not only large-area bearing contact, but also reliable positioning of the spring element on the first surface section.

According to a further advantageous embodiment of the sliding block according to the invention, the first and/or the second surface section are/is formed by a coating on the basic body, which coating is designed to be harder than the basic material.

A further advantageous embodiment of the sliding block according to the invention, in which the insert and/or the coating consist/consists of metal, has proved to be particularly wear-resistant.

In a further preferred embodiment of the sliding block according to the invention, the basic body has an intermediate part for arrangement between two adjacent spring elements and a sliding part. The sliding part and intermediate part are preferably formed in one piece from plastic.

In a particularly preferred embodiment of the sliding block according to the invention, the sliding part comprises a first sliding part section, which extends in one circumferential direction, and a second sliding part section, which extends in the other circumferential direction. Thus, the first sliding part section may serve for the radial support of a first spring element and the second sliding part section may serve for the radial support of a second spring element, whereas the intermediate part supports both the first and the second spring element on the end faces.

In a further advantageous embodiment of the sliding block according to the invention, the supporting surface for the radial support of a spring element is provided on the first and/or the second sliding part section.

In the installation state of the sliding blocks, in particular those sliding blocks which are arranged between two spring elements are affected by wear to the greatest extent, at least one of said spring elements being adjacent to the dog of a primary or secondary element of the torsional vibration damper. On these sliding blocks, in turn, the wear is the greatest on that side which faces the spring element adjacent to the dog. In order to provide a sliding block which, on the one hand, takes account of this fact and, on the other hand, can be produced simply, in a particularly preferred embodiment of the sliding block according, to the invention the supporting surface for the radial support of a spring element is provided only on the first sliding part section. This harder supporting surface can then serve for the radial support of the spring element adjacent to the dog.

Since the spring element which is adjacent to the dog of the primary or secondary element is supported by only one sliding block in the radial direction, while other spring elements are supported by two sliding blocks, in a further preferred embodiment of the sliding block according to the invention the first sliding part section is designed to be longer than the second sliding part section. The longer first sliding part section thus also ensures reliable radial support of the spring element adjacent to the dog of the primary or secondary element.

In a further advantageous embodiment of the sliding block according to the invention, the supporting surface for the axial support of a spring element is provided on the intermediate part.

The separator sheet according to the invention has at least two sliding blocks according to the invention. Thus, the separator sheet may comprise, for example, a ring element to which the sliding blocks according to the invention are fastened.

The torsional vibration damper according to the invention has at least one sliding block and/or one separator sheet of the type described above. As regards the advantages of the torsional vibration damper according to the invention, reference may be made to the above description of the sliding block according to the invention.

In a preferred embodiment of the torsional vibration damper according to the invention, the torsional vibration damper has a primary element with at least one primary dog, a secondary element with at least one secondary dog and at least one spring device for the spring-elastic coupling of the primary element and secondary element, the spring device comprising at least two spring elements which are arranged one behind the other in the circumferential direction and between which the sliding block is arranged.

In a further preferred embodiment of the torsional vibration damper according to the invention, the first surface section has the same hardness as the adjacent spring element.

As already explained above, those sliding blocks which are adjacent to a spring element are exposed to higher load, which spring element, in turn, is adjacent to a dog of the primary or secondary element. For this reason, in a particularly preferred embodiment of the torsional vibration damper according to the invention, both the sliding blocks according to the invention and conventional sliding blocks are provided, the sliding blocks according to the invention being adjacent to a spring element to which the primary dog and/or the secondary dog are/is adjacent, while the conventional sliding blocks are adjacent solely to spring elements which are not adjacent to the primary dog and/or the secondary dog. Hence, not all the sliding blocks have to be configured in the way according to the invention, but, instead, conventional plastic sliding blocks may also be used, without the wear or abrasion being increased sharply as a result.

The method according to the invention for producing a sliding block has the method steps of the provision of an insert which is designed to be harder than the basic material of a basic body of the sliding block, and of the casting of the insert into the basic body or of the riveting of the insert together with the basic body. The "casting" of the insert into the basic body is to be understood in this context as meaning that the basic body is cast, the insert having been introduced into the casting mold previously. Preferably, in this case, the cast-in insert is to be connected positively to the basic body. The method according to the invention can be carried out particularly simply and serves for providing a sliding block, the insert of which is connected particularly reliably to the basic body of the sliding block, even when pronounced temperature fluctuations occur.

In a preferred embodiment of the method according to the invention, the riveting of the insert together with the basic body has the method steps of the provision of a basic body having at least one projection which is formed in one piece with the basic body, of the laying of the insert onto the basic body and of the plastic deformation of the projection to produce a rivet head engaging clampingly behind the insert. This embodiment of the method ensures a particularly simple, rapid and reliable connection of the basic body to the insert.

In a particularly preferred embodiment of the method according to the invention, an insert having at least one clearance is provided, the insert being laid onto the basic body in such a way that the projection extends through the clearance. Such a clearance may, for example, be provided laterally oil the insert and ensures that the insert and basic body are held together particularly reliably.

Other objects, features, and advantages of the present invention will be readily appreciated as the same becomes better understood while reading the subsequent description taken in conjunction with the accompanying drawings.

BRIEF DESCRIPTION OF THE DRAWINGS

The invention is explained in more detail below by means of exemplary embodiments, with reference to the accompanying drawings in which:

FIG. 2 shows a diagrammatic front view of the torsional vibration damper from FIG. 1 in a first embodiment in a sectional illustration, FIG. 3 shows a diagrammatic front view of the torsional vibration damper from FIG. 1 in a second embodiment in a sectional illustration.

FIG. 8 shows a perspective illustration to illustrate the method according to the invention for producing a sliding block in a second embodiment, with the insert before being laid on the basic body and FIG. 9 shows the illustration from FIG. 8 with the insert laid onto the basic body.

DETAILED DESCRIPTION OF THE INVENTION

Figure 1:
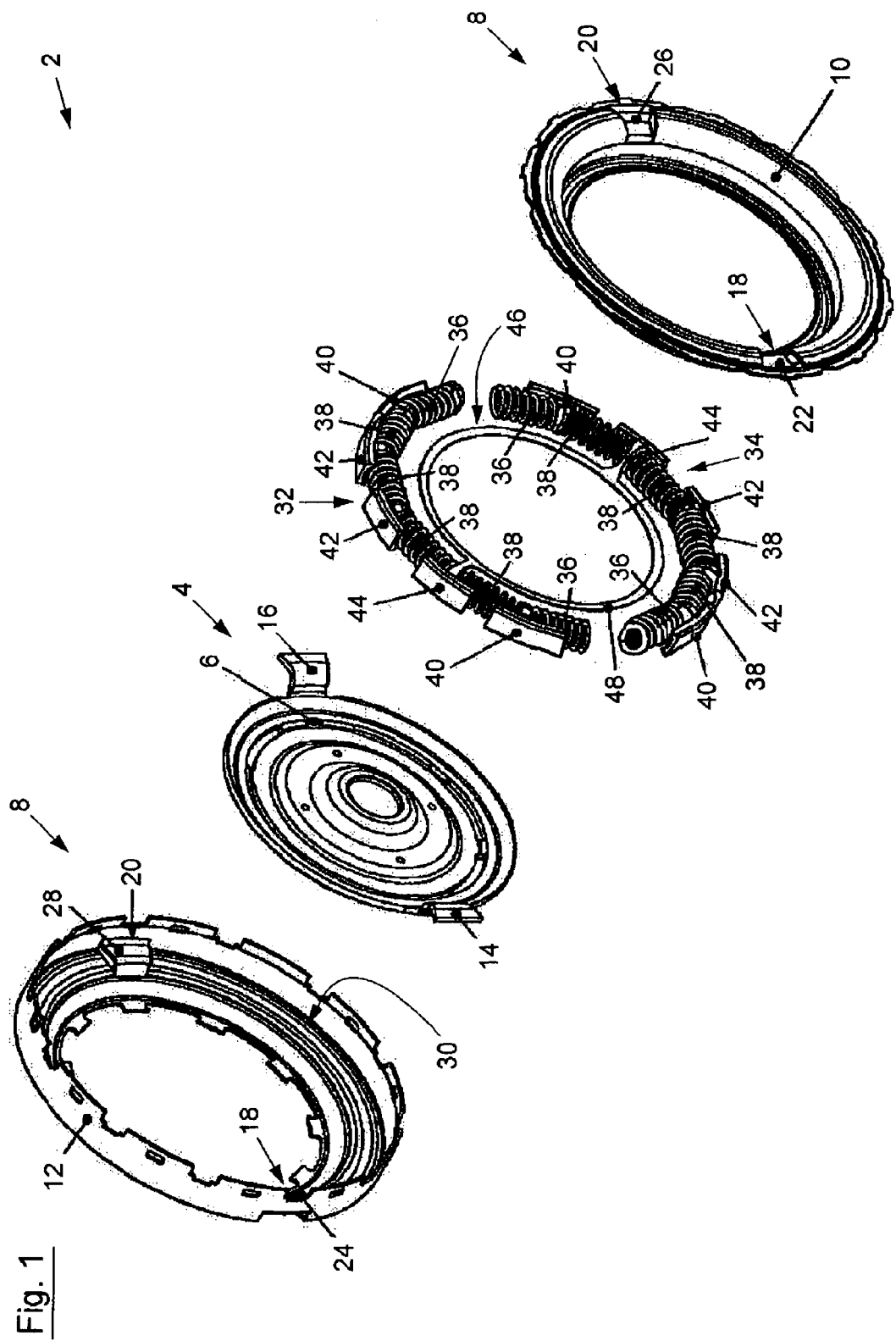
FIG. 1 shows a perspective exploded illustration of an embodiment of the torsional vibration damper according to the invention.

FIG. 1 shows a perspective exploded illustration of an embodiment of the torsional vibration damper 2 according to the invention. The torsional vibration damper 2 has an engine-side primary element 4 in the form of a middle disk 6 and a transmission-side secondary element 8, the latter being composed of a front side disk 10 and of a rear side disk 12 which are connected fixedly in terms of rotation to one another.

The primary element 4 in the form of the middle disk 6 has two dogs which are designated below as primary dogs 14, 16 and are arranged opposite one another on the outer circumference of the middle disk 6. Two dogs, which are designated below as secondary dogs 18, 20, are likewise provided on the two side disks 10, 12 of the secondary element 8. Like the secondary element 8 itself, the secondary dogs 18 and 20 are also composed of a front part 22 on the front side disk 10 and of a rear part 24 on the rear side disk 12 or of a front part 26 on the front side disk 10 and of a rear part 28 on the rear side disk 12. The primary and secondary dogs 14, 16, 18, 20 are preferably formed in one piece with the primary and secondary elements 4, 8 respectively.

In the assembled state, an annular space 30 is formed between the front side disk 10 and the rear side disk 12. Two spring devices 32, 34 are provided in the annular space 30 for the spring-elastic coupling of the primary element 4 and secondary element 8. The spring devices 32, 34 have a plurality of spring elements 36, 38 which are arranged one behind the other in the circumferential direction and are preferably designed as helical springs. In this case, the end spring elements 36, which are directly adjacent on the end faces to the primary and secondary dogs 14, 16, 18, 20, are to be distinguished from the intermediate spring elements 38 which are not adjacent to any primary or secondary dog 14, 16, 18, 20.

The spring devices 32, 34 comprise, furthermore, sliding blocks 40, 42, 44 which are arranged on the end faces between the spring elements 32, 34. In this case, first, the end sliding blocks 40, which are adjacent to the end spring elements 36, are to be distinguished from the other sliding blocks 42, 44. Moreover, the sliding blocks 42 are to be distinguished from the sliding blocks 44, since the latter are designed as part of a separator sheet 46. This separator sheet 46 comprises a ring element 48, on which the sliding blocks 44 are arranged circumferentially, one sliding block 44 extending between the spring elements 38 of one spring device 32, and the other sliding block 44 extending between the spring elements 38 of the other spring device 34. The sliding block 44 is also designated as a separating element when it is no longer supported slideably on another part of the torsional vibration damper 2, such as, for example, the rear side disk 12, on account of force compensation. As regards the advantages of a separator sheet, reference may be made to the prior art.

A rotation of the engine-side primary element 4 can be transferred spring-elastically to the transmission-side secondary element 8 via the primary dogs 14, 16 of the middle disk 6, the spring devices 32, 34 and the secondary dogs 18, 20 of the side disks 10, 12 connected fixedly in terms of rotation to one another.

The sliding blocks 40 and 42 are explained in more detail below in a first embodiment with reference to FIG. 2. Thus, the sliding blocks 40, 42 first have in each case a basic body 50 which consists of a basic material. This basic material is preferably fiber-reinforced plastic. The basic body 50 comprises an outer sliding part 52 and an intermediate part 54 extending radially inward, the intermediate part 54 being arranged between the end faces of the two spring elements 36, 38 and 38, 38 adjacent to the sliding block 40, 42.

The sliding part 52 has a first sliding part section 56 which, emanating from the intermediate part 54, extends in one circumferential direction 58 of the torsional vibration damper 2, and a second sliding part section 60, which, emanating from the intermediate part 54, extends in the other or opposite circumferential direction 62 of the torsional vibration damper 2. With regard to the end sliding block 40 which is adjacent to the end spring element 36, in this case the first sliding part section 56 is designed to be longer than the second sliding part section 60, so that the end spring element 36, which is adjacent to only one sliding block, can also be supported suitably in the radial direction.

The sliding blocks 40 and 42 have in each case a non-coherent first surface section 64 which faces the spring elements 36, 38 and 38, 38. This first surface section 64 is designed in this case to be harder than another surface section of the sliding block 40 or 42. In the embodiment illustrated, the surface section 64 comprises a first supporting surface 66, arranged on the first sliding part section 56, for the radial support of the spring element 36, 38, a second supporting surface 68, arranged on the second sliding part section 60, for the radial support of the spring element 38, 38, a first supporting surface 70, arranged on the intermediate part 54, for the axial support of the spring element 36, 38, and a second supporting surface 72, arranged on the other side of the intermediate part 54, for the axial support of the spring element 38, 38.

The sliding block 40, 42 has, furthermore, a second surface section 74 which comprises a radially outward-pointing sliding surface 76 for the sliding support of the sliding block 40, 42 on the collar (no reference symbol) of the rear side disk 12 of the secondary element 8. The second surface section 74 is in this case designed to be harder than another surface section of the sliding block 40, 42, but has a lower hardness than the first surface section 64. The second surface section 74 may basically be produced in the same way as the first surface section 64, as is explained below.

The first surface section 64 is formed by four metallic plate-like inserts 78, 80, 82 and 84, of which in each case one side forms the first supporting surface 66 for the radial support, the first supporting surface 70 for the axial support, the second supporting surface 72 for the axial support and the first supporting surface 68 for the radial support of the spring elements 36, 38. The inserts 78, 80, 82, 84, which are designed to be harder than the basic material of the basic body 50, are cast into the basic material, which can be achieved, for example, by means of an injection molding method. The hardness of the inserts 78, 80, 82, 84 corresponds here in each case to the hardness of the spring elements 36, 38 adjacent to the inserts 78, 80, 82, 84.

Alternatively, however, the first surface section 64 may also be formed by a corresponding coating on the basic body 50, which coating is correspondingly harder than the basic material. The plate-like insert 78, 84 on the first and second sliding part sections 56, 60 may, furthermore, be designed to be curved in such a way so as to ensure a large-area radial support and reliable positioning of the spring element 36, 38. This is explained in more detail later with reference to FIG. 4.

The functioning of the torsional vibration damper 2 is explained below. During operation, the torsional vibration damper 2 rotates about its axis of rotation. The spring elements 36, 38 bear on the end faces against the supporting surfaces 70, 72 and at least partially against the supporting surfaces 66, 68 of the first surface section 64 on the sliding block 40, 42. At particularly high rotational speeds, the spring elements 36, 38 additionally bend outward in the radial direction of the torsional vibration damper 2, so that the spring elements 36, 38 bear at further points on the supporting surfaces 66, 68 for radial support. As a result of the compression and subsequent renewed extension of the spring elements 36, 38, the individual thus of the spring elements 36, 38 are displaced with respect to the supporting surfaces 66, 68, thus giving rise to pronounced friction between the spring element 36, 38, on the one hand, and the supporting surface 66, 68, on the other hand. Owing to the harder first surface section 64, however, high wear on the sliding block 40, 42 is prevented. Moreover, the abrasion is lower, with the result that contamination of the lubricant (not illustrated) within the torsional vibration damper 2 is largely avoided. The lubricant may be, for example, oil. The same applies correspondingly to the supporting surfaces 70, 72 of the first surface section, the friction caused by the relative movement between the spring element 36, 38 and sliding block 40, 42 being lower here.

The fact that the end sliding blocks 40 which are adjacent to an end spring element 36 are exposed to a higher wearing load than the sliding blocks 42 adjacent only to a spring element 38 has been taken into account in a further embodiment of the torsional vibration damper 2 which is shown in FIG. 3. The secondary embodiment is in this case similar to the first embodiment, and therefore only the differences are dealt with below and the same reference symbols are used for the same parts, the above description then applying accordingly.

In this embodiment, the sliding blocks according to the invention having the harder first surface section 64 are used as end sliding blocks 40 which are adjacent to an end spring element 36. Furthermore, conventional sliding blocks 42' are used as sliding blocks 42 which are adjacent solely to the spring elements 38 which are not adjacent to the primary dog 14, 16 and/or the secondary dog 18, 20. which conventional sliding blocks also have a first surface section which faces the spring elements 38 and serves for support, but which is not designed to be harder than other surface sections. Thus, for example, the conventional sliding block 42' may consist completely of fiber-reinforced plastic and have a harder sliding surface 76.

Figure 4:
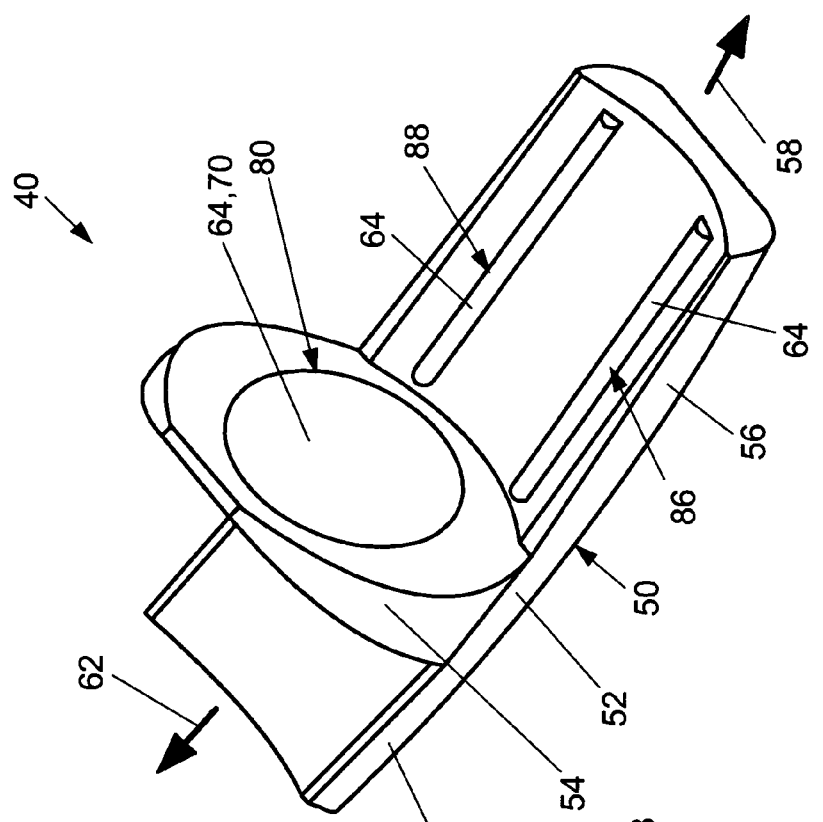
FIG. 4 shows a perspective illustration of a sliding block from FIG. 3 in a first embodiment.

Moreover, the end sliding block 40 of the second embodiment, which is also illustrated in perspective in FIG. 4, is modified with respect to the sliding block 40 of the first embodiment to the effect that the harder supporting surface 66 for the radial support of the end spring element 36 is provided only on the first sliding pail section 56. A harder supporting surface for the radial support of the spring element 38 also adjacent to the sliding block 40 is not provided on the second sliding part section 60. The outlay in manufacturing terms is therefore increased only with regard to the end sliding blocks 40. whereas the outlay for the conventional sliding blocks 42' is low. Despite the use of conventional sliding blocks 42' in addition to the sliding blocks 40 according to the invention, the abrasion and therefore the contamination of the lubricant within the torsional vibration damper 2 are low.

The plate-like insert 78 for forming the supporting surface 66 is curved in a way ensuring a large-area radial support of the end spring element 36. Thus, the insert 78 is curved in such a way that the first surface section 64 surrounds the end spring element 36 partially with a close fit. thereby ensuring not only a large-area bearing contact, but also a reliable positioning of the spring element on the first surface section 64.

Figure 5:
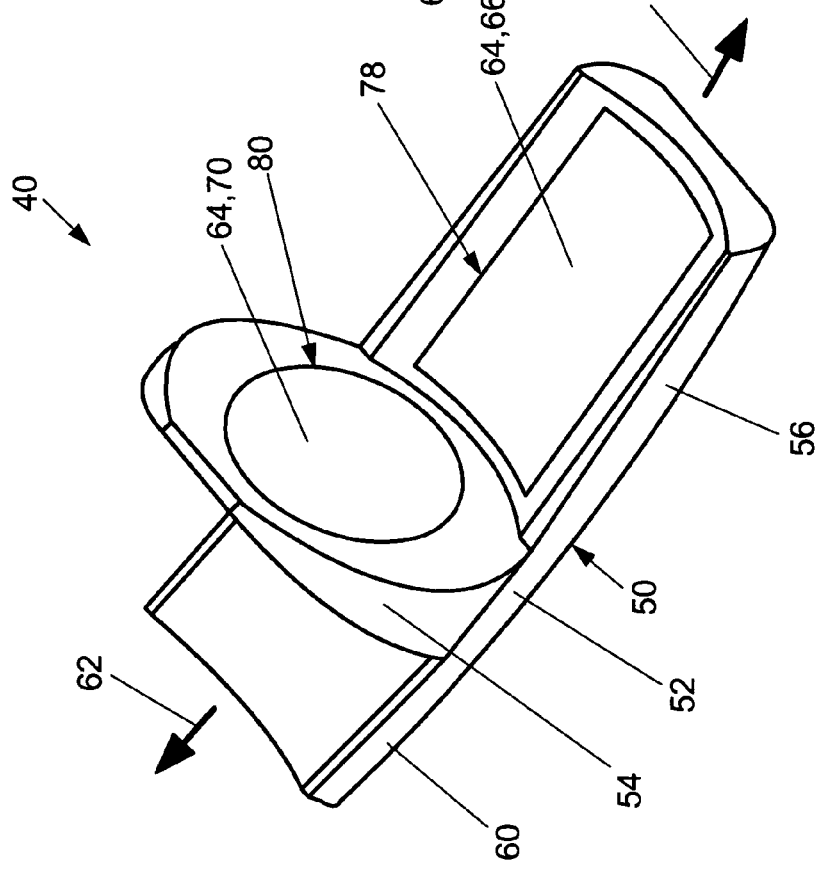
FIG. 5 shows a perspective illustration of a sliding block from FIG. 3 in a second embodiment.

An alternative embodiment of the design of the supporting surface 66 is shown in FIG. 5. Here, the first surface section 64 is formed inter alia by two elongate rail-like inserts 86, 88 which, spaced apart from one another, extend parallel to one another in the longitudinal direction of the first sliding part section 56. Since die rail-like inserts 86, 88 project in the direction of the end spring element 36, the spring element 36 can be supported, that is to say reliably positioned, in a centering manner in the radial direction.

Figure 6:
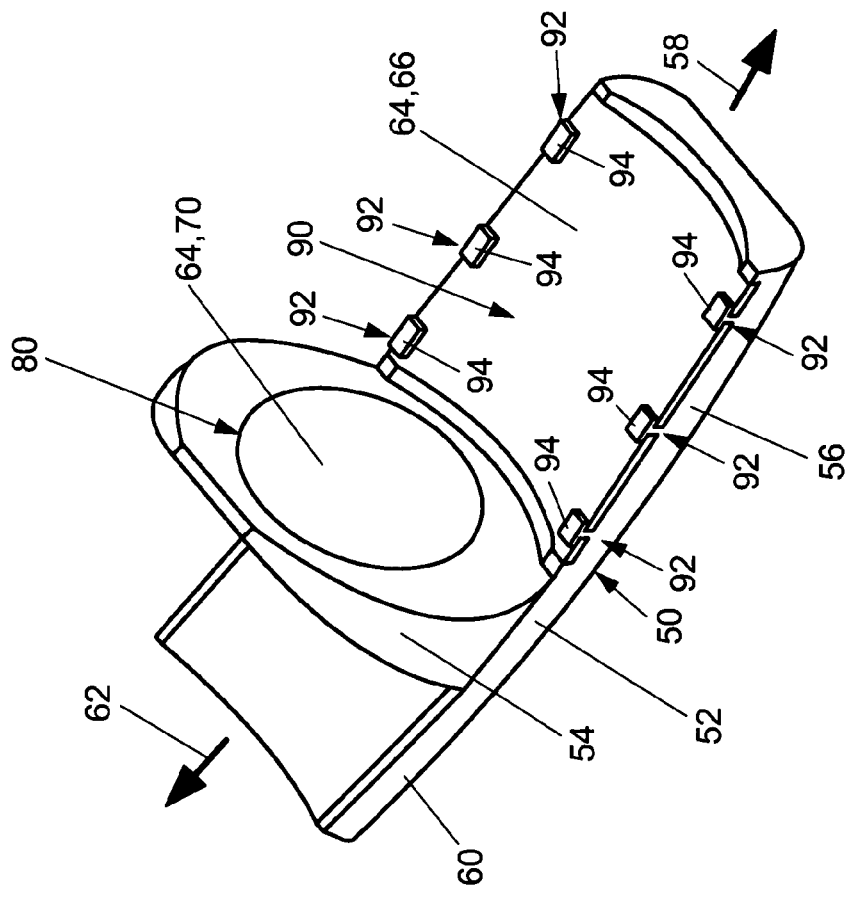
FIG. 6 shows a perspective illustration of a sliding block from FIG. 3 in a third embodiment.

A further alternative embodiment of the design of the supporting surface 66 is shown in FIG. 6. This embodiment corresponds largely to the embodiment of FIG. 4, and therefore only the differences from the embodiment according to FIG. 4 are dealt with below, the same reference symbols being used for identical or similar parts, and the above description otherwise applying accordingly.

In the sliding block 40 according to FIG. 6, the first surface section 64 is formed at least partially by a plate-like insert 90. Just like the insert 78 of FIG. 4, the plate-like insert 90 is connected positively to the basic body 50 of the sliding block 40, this being advantageous in as much as the insert 90 and the basic body 50 are held together reliably. In contrast to FIG. 4, however, the insert 90 is not cast into the basic body 50, but is riveted together with latter. For this purpose, a plurality of rivet bodies 92 are provided, which are formed in one piece with the basic body 50. The rivet bodies 92 therefore consist of the same material as the basic body 50 and have preferably been produced in a common casting method with the basic body 50, as is explained in more detail later. The rivet bodies 92 in each case have a rivet head 94 which engages clampingly behind the insert 90, so that the insert 90 is fastened securely to the basic body 50.

The separator sheet shown in FIG. 1 may have as sliding blocks 44 sliding blocks which are designed in the same way as the sliding blocks 40, 42, 42' from FIGS. 1 to 6. In this case, the intermediate parts could, for example. be extended radially inward and be connected to the ring element 48.

Figure 7:
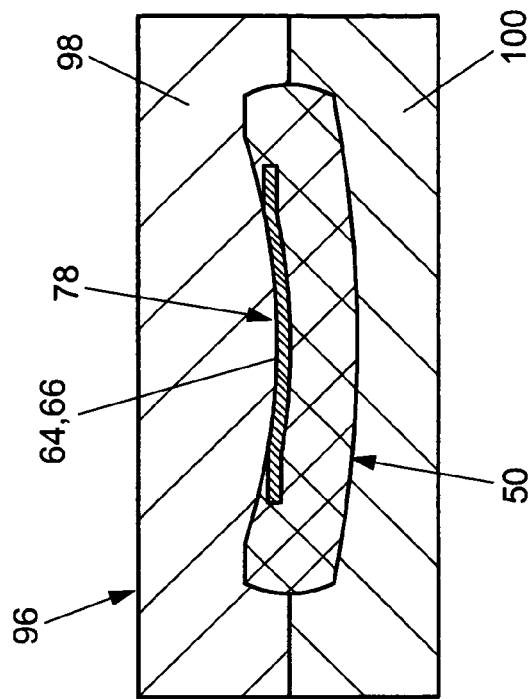
FIG. 7 shows a cross section through a casting mold to illustrate the method according to the invention for producing a sliding block in a first embodiment.

A first embodiment of the method according to the invention for producing a sliding block according to the invention is explained below with reference to FIG. 7. FIG. 7 shows a cross section through a casting mold 96 which is composed of an upper part 98 and of a lower part 100 which enclose a cavity corresponding essentially to the final shape of the sliding block 40 of FIG. 4 to be produced. In this first embodiment of the method, the plate-like insert 78 is first introduced into the cavity inside the casting mold. In this case, that surface of the insert 78 bears against a side of the casting mold 96 which is later to form the exposed first supporting surface 66 of the first surface section 64. The cavity is subsequently filled with the basic material of the basic body 50. as indicated by the double hatching. The insert 78 is in this case surrounded by the basic material in such a way that said insert is connected firmly to the cured basic body 50. The insert 78 is thus cast into the basic body 50 or the basic material.

A second embodiment of the method according to the invention for producing the sliding block 40 according to FIG. 6 is illustrated in FIGS. 8 and 9. Here, first, a basic body 50 is provided which has a plurality of projections 102 which are formed in one piece with the basic body 50 and therefore also consist of the same basic material (FIG. 8). Furthermore, a separate insert 90 is provided which has marginal clearances 104. The insert 90 is subsequently laid onto the basic body 50 in such a way that the projections 102 extend through the clearances 104, as can be seen in FIG. 9. Those ends of the projections 102 which protrude through the clearances 104 are then deformed plastically in such a way that they form the rivet head 94 (FIG. 6) of the rivet body 92. The rivet head 94 engages clampingly behind the margin of the clearances 104 of the insert 90, so that the insert 90 is fastened to the basic body 50.

Both embodiments of the method which were described above bring about an advantageous positive connection between the basic body 50 and the inserts 78 or 90, so that a particularly reliable hold of the insert 78 or 90 on the basic body 50 is ensured.

The sliding block 40, 42, 44 is particularly wear-resistant and generates only insignificant abrasion during operation of the damper 2. Also, the second surface section 74 does not have to be as hard as the first surface section 64 to prevent wear of the sliding block 40, 42, 44. Furthermore, mass of the (rotating) sliding block 40, 42, 44 can be kept low while a high strength of the basic body 50 is ensured, and production of the sliding block 40, 42, 44 is simpler. In addition, a particularly simple, rapid, and reliable hold of the insert(s) 78, 80, 82, 84, 86, 88, 90 on the basic body 50, even in pronounced temperature variations, is ensured during operation of the damper 2. Moreover, the rivet body 92 and insert(s) 78, 80, 82, 84, 86, 88, 90 are fastened particularly reliably to the basic body 50, and the rivet body 92 and basic body 50 can be manufactured together from the same basic material, thereby avoiding a need for fastening the rivet body 92 to the basic body 50. The sliding block 40, 42, 44 centers the spring element(s) 36, 38 automatically and reliably in a predetermined position, provides a large area of the first surface section 64 without use of a multitude of the inserts 78, 80, 82, 84, 86, 88, 90 in production of the sliding block 40, 42, 44, and ensures a large-area bearing contact and reliable positioning and radial support of the spring element(s) 36, 38 as well.

The separator sheet 46 includes the sliding block 40, 42, 44, and the damper 2 includes the separator sheet 46. Abrasion-induced contamination of the damper 2 during operation thereof is particularly low. Also, conventional plastic sliding blocks may be used with the damper 2 without wear or abrasion being increased sharply. Furthermore, the method of the present invention produces the sliding block 40, 42, 44 and can be carried out particularly simply.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

The invention claimed is:

1. A sliding block (40, 42, 44) for a torsional vibration damper including at least one spring element, the sliding block (40, 42, 44) comprising:
a first surface section (64) that operatively faces an adjacent one of the spring element, is harder than another surface section of the sliding block (40, 42, 44), has at least one of first and second supporting surfaces (66, 68) for radial support of the spring element, and has at least one of first and second supporting surfaces (70, 72) for axial support of the spring element;
a second surface section (74) that has a sliding surface (76) for sliding support of the sliding block (40, 42, 44); and
a basic body (50) that includes plastic, wherein at least one of the first and second surface sections (64, 74) is formed by at least one first insert (78, 80, 82, 84, 90) that is harder than the plastic and the first surface section (64) is formed by at least two elongate second inserts (86, 88) that are spaced apart from one another and projected and on which the spring element can be supported in a centering manner in a radial direction.

2. The sliding block as set forth in claim 1, wherein the second surface section (74) is harder than another surface section of the sliding block (40, 42, 44).

3. The sliding block as set forth in claim 2, wherein the first surface section (64) is harder than the second surface section (74).

4. The sliding block as set forth in claim 1, wherein the plastic is fiber-reinforced.

5. The sliding block as set forth in claim 1, wherein the insert (78, 80, 82, 84, 90) is connected positively to the basic body (50).

6. The sliding block as set forth in claim 1, wherein the first insert (78, 80, 82, 84, 90) is either of cast into the plastic and riveted together with the basic body (50).

7. The sliding block as set forth in claim 6, wherein at least one rivet body (92) for riveting the first insert (78, 80, 82, 84, 90) is formed in one piece with the basic body (50).

8. The sliding block as set forth in claim 1, wherein the first insert (78, 80, 82, 84) is plate-like.

9. The sliding block as set forth in claim 8, wherein the first insert (78, 84) is curved to ensure a large area of the radial support of the spring element.

10. The sliding block as set forth in claim 1, wherein at least one of the first and second surface sections (64, 74) is formed by a coating on the basic body (50) that is harder than the plastic.

11. The sliding block as set forth in claim 10, wherein at least one of the first insert (78, 80, 82, 84) and coating includes metal.

12. The sliding block as set forth in claim 1, wherein the sliding block (40, 42, 44) includes a sliding part (52), the torsional vibration damper includes a plurality of spring elements, and the basic body (50) has an intermediate part (54) arranged between two adjacent ones of the spring elements and the sliding part (52).

13. The sliding block as set forth in claim 12, wherein the sliding part (52) comprises a first sliding part section (56), which extends in one circumferential direction (58), and a second sliding part section (60), which extends in the other circumferential direction (62).

14. The sliding block as set forth in claim 13, wherein at least one of the first and second supporting surfaces (66, 68) for the radial support of the spring elements is provided on at least one of the first and second sliding part sections (56, 60).

15. The sliding block as set forth in claim 14, wherein the first sliding part section (56) is longer than the second sliding part section (60).

16. The sliding block as set forth in claim 12, wherein at least one of the first and second supporting surfaces (70, 72) for the axial support of the spring elements is provided on the intermediate part (54).

17. A separator sheet (46) for a torsional vibration damper including at least one spring element, the separator sheet comprising:
at least one sliding block (40, 42, 44) having:
a first surface section (64) that operatively faces an adjacent one of the spring element, is harder than another surface section of the sliding block (40, 42, 44), has at least one of first and second supporting surfaces (66, 68) for radial support of the spring element, and has at least one of first and second supporting surfaces (70, 72) for axial support of the spring element;
a second surface section (74) which has a sliding surface (76) for sliding support of the sliding block (40, 42, 44); and
a basic body (50) that includes plastic, wherein at least one of the first and second surface sections (64, 74) is formed by at least one first insert (78, 80, 82, 84, 90) which is harder than the plastic and the first surface section (64) is formed by at least two elongate second inserts (86, 88) which are spaced apart from one another and projected and on which the spring element can be supported in a centering manner in a radial direction.

18. A torsional vibration damper (2) comprising:
at least one spring element; and
at least one sliding block (40, 42, 44) having:
a first surface section (64) that operatively faces an adjacent one of the spring element, is harder than another surface section of the sliding block (40, 42, 44), has at least one of first and second supporting surfaces (66, 68) for radial support of the spring element, and has at least one of first and second supporting surfaces (70, 72) for axial support of the spring element;
a second surface section (74) which has a sliding surface (76) for sliding support of the sliding block (40, 42, 44); and
a basic body (50) that includes plastic, wherein at least one of the first and second surface sections (64, 74) is formed by at least one first insert (78, 80, 82, 84, 90) which is harder than the plastic and the first surface section (64) is formed by at least two elongate second inserts (86, 88) which are spaced apart from one another and projected and on which the spring element can be supported in a centering manner in a radial direction.

19. The torsional vibration damper as set forth in claim 18, wherein the torsional vibration damper (2) has a pair of spring elements, a primary element (4) including at least one primary dog (14, 16), a secondary element (8) including at least one secondary dog (18, 20), and at least one spring device (32, 34) for spring-elastic coupling of the primary element (4) to the secondary element (8), wherein the spring device (32, 34) has the spring elements (36, 38), one of the spring elements is arranged behind another of the spring elements in a circumferential direction, and the sliding block (40, 42, 44) is arranged between the spring elements.

20. The torsional vibration damper as set forth in claim 19, wherein the first surface section (64) is substantially at least as hard as at least an adjacent one of the spring elements (36, 38).

21. The torsional vibration damper as set forth in claim 19, wherein the sliding block (40, 42, 44) is adjacent to one of the spring elements (36) to which at least one of the primary dog (14, 16) and secondary dog (18, 20) is adjacent and the torsional vibration damper includes at least one conventional sliding block (42') adjacent to another of the spring elements (38), which are not adjacent to the at least one of the primary dog (14, 16) and secondary dog (18, 20).

22. A torsional vibration damper as set forth in claim 18, wherein the torsional vibration damper includes a separator sheet that includes the sliding block.

23. A method for producing a sliding block for a torsional vibration damper including at least one spring element, the method comprising steps of:
providing a first surface section that operatively faces an adjacent one of the spring element and is harder than another surface section of the sliding block, has at least one of first and second supporting surfaces for radial support of the spring element, and has at least one of first and second supporting surfaces for axial support of the spring element;
providing a second surface section (74) which has a sliding surface (76) for sliding support of the sliding block (40, 42, 44); and
providing a basic body (50) that includes plastic, wherein at least one of the first and second surface sections (64, 74) is formed by at least one first insert (78, 80, 82, 84, 90) which is harder than the plastic and the first surface section (64) is formed by at least two elongate second inserts (86, 88) which are spaced apart from one another and projected and on which the spring element can be supported in a centering manner in a radial direction.

24. The method for producing a sliding block as set forth in claim 23, wherein the step of riveting the insert together with the basic body includes providing at least one projection formed in one piece with the basic body, laying the insert onto the basic body, and plastically deforming the projection to produce a rivet head engaging clampingly behind the insert.

25. The method for producing a sliding block as set forth in claim 24, wherein the insert defines at least one clearance and is laid onto the basic body such that the projection extends through the clearance.

* * * * *